Nov. 24, 1936.   W. H. OFFENHAUSER, JR   2,061,737
DIRECTIONAL RECEIVING SYSTEM
Filed Oct. 6, 1932   2 Sheets-Sheet 1

INVENTOR
William H. Offenhauser Jr.
BY
ATTORNEY

Nov. 24, 1936. W. H. OFFENHAUSER, JR 2,061,737
DIRECTIONAL RECEIVING SYSTEM
Filed Oct. 6, 1932   2 Sheets-Sheet 2

Patented Nov. 24, 1936

2,061,737

UNITED STATES PATENT OFFICE 2,061,737

DIRECTIONAL RECEIVING SYSTEM

William H. Offenhauser, Jr., Conshohocken, Pa.

Application October 6, 1932, Serial No. 636,563

3 Claims. (Cl. 250—11)

The present invention relates to receiving systems, more particularly directional receiving systems for determining the direction from which radio signals are received or for obtaining sensitivity by the use of directive reception effects and more particularly to methods of and apparatus for such reception by which improved angular sensitivity, angular selectivity, accuracy and ease of operation may be obtained.

The device comprising the invention includes a plurality of signal pickup means by which the signal may be received with maximum intensity from a given direction and from the same direction with minimum intensity for the purpose of inversely controlling the amplification of the signal first received.

Present day directional systems, more particularly direction finding systems, depend for their directional characteristics upon the orientation of a receiving "loop" or "loops" with respect to the field whose radiation source location is known or is to be determined. Roughly these indications fall into two general classes, 1, the null indication type, 2, the positive indication type.

Direction finders are generally of the null indication type. To secure a direction indication with such equipment, two major steps are generally taken.

1. The signal is "brought in" as strongly as possible (by "swinging" the loop) to give the observer a general indication of the location of the transmitter of interest.

2. The amplifier gain is then increased and the loop is "swung" approximately parallel with the field of the transmitter hereinbefore specified to secure a null indication. The loop is then swung slightly in one direction and the readings noted. It is then swung in the opposite direction until readings of like magnitude are noted. The point halfway between the two indicated angular points is considered the direction of the transmitter. Ordinarily several such readings are taken; each successive reading oftentimes taken with reduced angular differential and correspondingly increased amplifier gain, so that an average may be used. It is obvious that an average is necessary where readings of reasonable accuracy are desired due to the uncertainty always attendant to a null type indication.

The principal reason that the positive indication is not used in the ordinary direction finder is that such method gives low angular sensitivity by which is meant that the rate of change of indication with angular change as the angle approaches that for maximum indication is very low. In other words, the change in angular sensitivity becomes less as we approach maximum indication. Therefore, such directional receivers are useful principally for obtaining a measure of directional selectivity by which is meant the selectivity resulting from the angular sensitivity.

It is the object of the present invention to produce a system for and method of directional reception which overcomes the above noted disadvantages of the present systems and results in a direction finder which shall not only be easier to operate but shall have increased angular sensitivity.

It is a further object of this invention to produce a system for directional reception which shall be more certain in its operation and permit less likelihood of error due to cessation of signal and fading of the received signal waves during the measurement period.

It is a still further object of the invention to produce a system for directional reception which will give increased angular selectivity.

These and further objects of the invention will become apparent from the following specification and the appended claims taken in connection with the accompanying drawings.

In accomplishing the objects of this invention, a plurality of signal pickups are provided; at least one of which, or the combination of two of which are of higher angular sensitivity. The pickup from this system is used to inversely control the amplification of the same signal as received on one of the other of said pickup means.

Though subject to a number of embodiments, the systems of this invention embody the same generic method which simply stated is the control of the amplification of a signal inversely in accordance with the intensity of the signal received by the null method as above described.

More particularly two loop pickups may be provided; one being fixed at a horizontal angle of 90 degrees from the other so that as one receives a given signal at maximum intensity, the other receives the same signal at minimum intensity. The amplification of the signal received by the first mentioned loop is controlled by the signal received by the second mentioned loop so that if a perceptible signal is received by said second mentioned loop, the signal amplifier connected to the first mentioned loop is blocked. This greatly increases the apparent angular sensitivity of the first mentioned loop and gives the positive indication method the angular sensitivity of the null system. The amplification of the controlling current, as that current resulting from the null method pickup loop will be called hereinafter, may be so adjusted that a voltage slight enough to make no impression upon an observer except by accurately sensitive instruments will block the signal amplifier, whereas a very slight change, which would be imperceptible to the ear would cause full amplification of the signal. This results in greatly increased angular sensitivity as well as selectivity.

An alternative form is to provide two parallel loops, mounted to rotate horizontally together about a point midway between their centers. The currents from the two loops which are positioned when receiving a signal so that their common axis is at right angles to the direction of reception are combined in phase to provide the signal current and out of phase to provide the control current.

A second alternative form contemplates the use of a single loop to provide the controlling current and a non-directional pickup to provide the signal current.

An additional modification presumes the use of a single loop to provide the controlling current and an independent source possibly even a local generator to provide the signal current.

In any or all of the several forms of the invention phase correction devices may be added wherever desirable or necessary.

Having thus briefly described my invention, attention is invited to the mathematical theory on which it is based. In the following discussion, the first derivative of the particular trigonometric function under consideration is a measure of the angular sensitivity of the particular directional receiving device. Further, the second derivative of that trigonometric function under consideration is a measure of the angular selectivity of the particular directional receiving device.

With this in mind, it is at once seen than for the cosine function, the angular sensitivity is zero when the angular selectivity is a maximum, that is unity. The practical embodiment of the cosine function in this respect is the present null indication system.

Likewise, it is obvious that for the sine function, the angular sensitivity is maximum, that is unity, when the angular selectivity is zero. The practical embodiment of the sine function in this respect is the present positive indication system.

On the trigonometric basis, then, the "best" direction finding system is one which combines the angular selectivity of the null indication system with the angular selectivity of the positive indication system and which has as an additional advantage a very high ratio of angular selectivity to angular sensitivity. Investigation of the various functions shows the tangent function to have these qualifications and, in addition, to have the very desirable qualification that the ratio of angular selectivity to angular sensitivity is variable and increases at a very great rate as the indication approaches a maximum. This function is symbolized in this invention where the controlling current and the signal current are both dependent upon the radiated signal; are out of phase with respect to each other; and where the controlling current is used to inversely control the amplification of the aforementioned radiated signal.

In like manner, other trigonometric functions are symbolized within this application and it is the intention of the inventor that he shall not be limited only to such functions symbolized within the apparatus and method applications made a part hereof.

In the practical embodiment of the principles herein disclosed, it is to be appreciated that other features may be included within the devices themselves to achieve still other desirable operating advantages. For example, if we assume a constant field intensity at the point of measurement, the mathematical relationship between any two differentially related functions such as angular sensivity and angular selectivity may be made non-linear with respect to that trigonometric relationship through the use of such non-linear circuit elements, adjuncts or devices such as square law detectors, variable mu tubes, "class C" amplifiers and so forth. Likewise if we assume a constant angular sensitivity, the relationship between field intensity at the point of measurement and the angular selectivity may be made non-linear trigonometrically through the use of such non-linear circuit elements, adjuncts or devices as square law detectors variable mu tubes, "class C" amplifiers and so forth.

Having thus described the invention, attention is invited to the accompanying drawings in which

Figure 1:
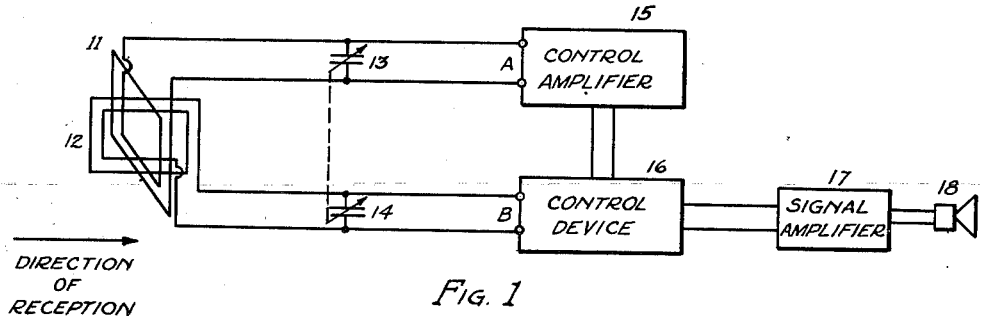
Figure 1 shows schematically, a directional receiving system employing two directional collectors or loops arranged at right angles.

Referring now more particularly to Figure 1, directional collector 11, tuned by condenser 13 provides the input voltage to control amplifier 15 at point A. The control amplifier in its usual form, consists of an amplifier associated with a unilateral device such as a detector or rectifier in combination with an appropriate delay device as will be described more in detail in connection with Figure 5. Directional collector 12 tuned by condenser 14, provides the input signal voltage to the control device 16 at point B. The controlling current provided from the control amplifier 15 to the control device 16 changes the amplification of the signal. The output of the control device 16 actuates the signal amplifier 17. The output of the signal amplifier 17 is then connected to the desired load which may be a meter, loudspeaker or other output indicating or measuring device. When the collectors 11 and 12 are so disposed that collector 12 is perpendicular to the field of the radiated signal of interest as indicated in the drawings, minimum voltage is supplied at point A and maximum voltage at point B. Thus the controlling current from the control amplifier 15 acting through the control device 16 causes maximum amplification of the signal. Collector 12 at the same time provides maximum voltage at point B. This combination produces maximum effect upon output device 18. When collectors 11 and 12 are moved slightly with respect to the direction of reception, a perceptible signal is received by collector 11 thereby blocking the control device 16. It is to be observed in connection with this figure that collectors 11 and 12 are mutually perpendicular and fixed in relation to one another but not fixed with respect to the direction of reception. In all cases, condensers 13 and 14 may be operated by a single control as indicated by the dotted line connecting those condensers.

Figure 2:
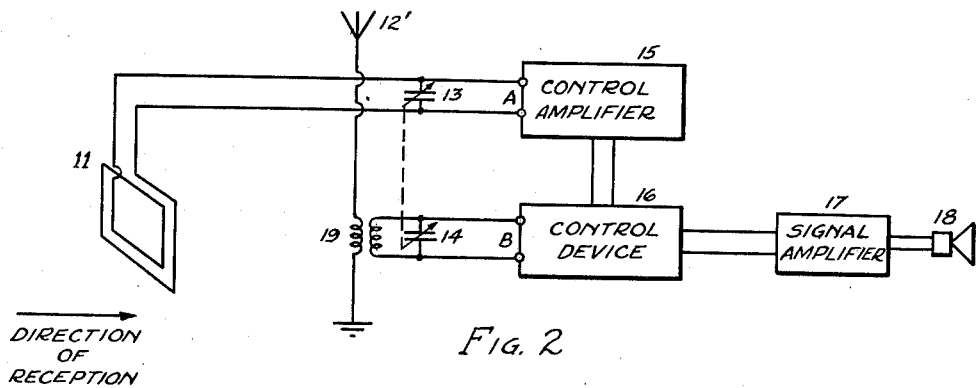
Figure 2 shows a schematic arrangement of a system employing a single loop and a non-directional pick-up or other dependent energy source.

Referring now to Figure 2, directional collector 11, tuned by condenser 13 provides the input voltage to control amplifier 15 at point A. Collector 12' coupled through coupling device 19 and tuned by condenser 14 provides the input signal voltage to the control device at point B. From points A and B the operation is the same as that described under Figure 1. When collector 11 is moved slightly with respect to the direction of reception, a perceptible signal is received by said collector 11 thereby blocking the control device 16. Here also as in Figure 1, condensers 13 and 14 may be operated by a single control as indicated.

Figure 3:
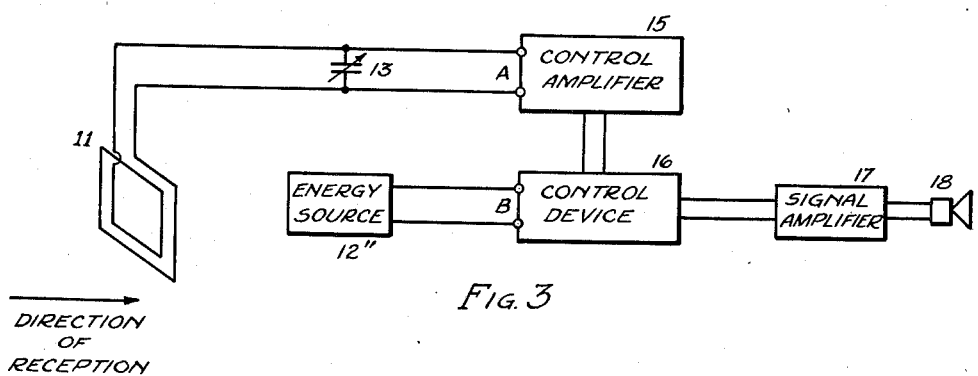
Figure 3 shows a schematic connection of a system employing a single loop and an independent energy source.

Referring now to Figure 3, directional collector 11 tuned by condenser 13 provides the input voltage to control amplifier 15 at point A. Energy source 12" which may be a local generator provides the input signal voltage to control device 16 at point B. From points A and B the operation is the same as that in Figures 1 and 2. When collector 11 is moved slightly, with respect to the direction of reception, a perceptible signal is received by said collector 11, thereby blocking control device 16.

Figure 4:
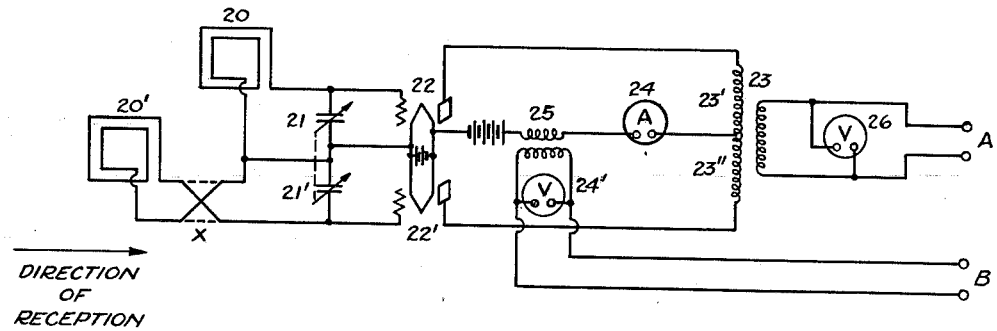
Figure 4 shows a schematic arrangement of a system employing two parallel directional collectors or loops.

Referring now to Figure 4, showing the schematic arrangement of a system employing two mutually parallel directional collectors or loops, loops 20 and 20' tuned by condensers 21 and 21' respectively supply voltages to two coupling tubes 22 and 22'. The output circuit of coupling tubes 22 and 22' includes the primary 23' and 23" respectively of control amplifier transformer 23, the common leads of ammeter 24 and the primary of signal transformer 25. The secondary of signal transformer 25 provides the input voltage to point B. The secondary of the transformer 23 provides the input voltage to point A. A voltmeter 26 may be used as indicated to measure the voltage across the control voltage circuit and a similar voltmeter 24' may be used to measure that across the signal circuit. When collectors 20 and 20' are moved at an angle with respect to the direction of reception, a signal appears at point A thereby blocking the control amplifier. When, however, the two loops are so adjusted that their common axis is at right angles relative to the direction of reception, the current in the output of the two coupling tubes being out of phase and adjustable to affect the secondary of transformer 23 equally, a null indication is received at point A and at the same instant maximum current exists in the common portion of the output circuit of the coupling tubes giving maximum signal voltage at point B. At this instant, maximum voltage will be indicated by meter 24' and minimum or zero voltage will be indicated by meter 26.

It is intended that these voltages be supplied to the corresponding amplifiers and control devices that the pickup arrangements shown in Figures 1 to 4 inclusive supply, as will be described more fully immediately hereinafter. It is to be understood that the relative voltages existing at A and B may be otherwise compared either electrically or visually as by illuminating the meter 26 produced from point B or as by a photometer effect by means of lights controlled both by voltages from points A and B.

By reversing the connections to one of the loops at point X, the current in 25 will be minimum when making an observation of direction and the maximum voltage will be that instant observed at A. Thus, points A and B will be effectually reversed from the condition shown.

Figure 5:
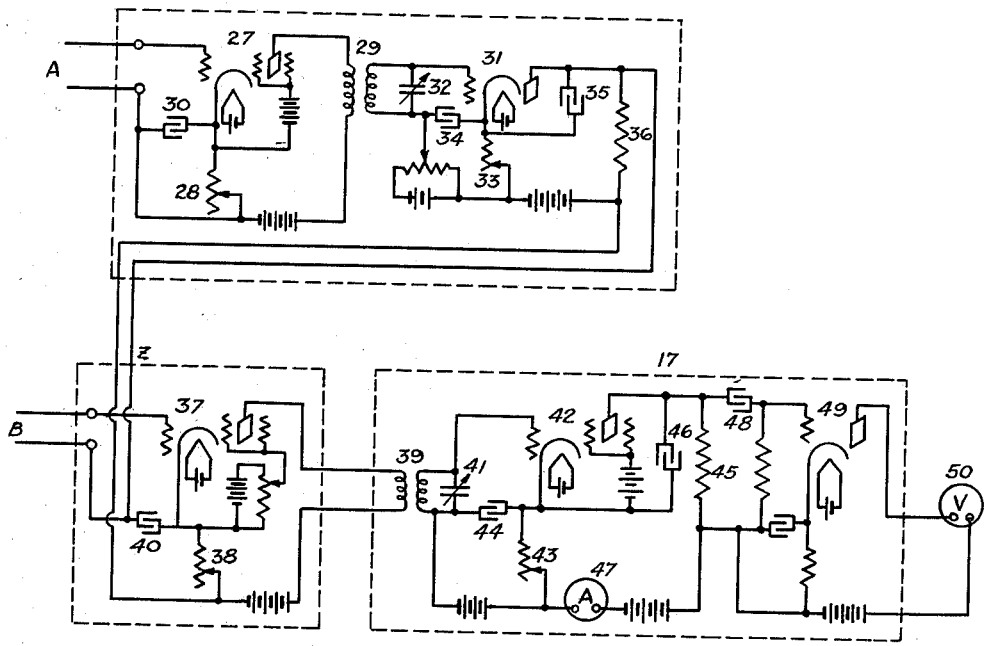
Figure 5 is a circuit diagram showing the arrangement of signal and control amplifiers for use with the pick-up arrangements shown in Figures 1, 2, 3 or 4.

Referring now to Figure 5 which is a circuit diagram showing the arrangement of signal and control amplifiers and control device for use with the pickup arrangements shown in Figures 1, 2, 3 or 4, the controlling voltage appearing at point A provides the voltage for actuating vacuum tube 27. The desired operation of the vacuum tube selected is obtained by adjustment of the indicated local batteries, the resistance of bias resistor 28 and the capacitance of by pass condenser 30. The output of vacuum tube 27 delivers energy to the coupling transformer 29 whose secondary tuned by condenser 32 excites detector tube 31. The desired operation of the vacuum tube here selected is obtained by adjustment of the indicated local batteries and their controls, the resistance of bias resistor 33 and the capacitance 34. The output circuit of vacuum tube 31 includes impedance 36, the local plate battery and bias resistor 33, across which is shunted condenser 35; said impedance 36, bias resistor 33 and the local plate battery being mutually in series with each other. The load circuit of vacuum tube 31 is of such low impedance in comparison with the plate impedance of said vacuum tube 31 that "square law" detector operation is approached. The controlling current for actuating control device 16 is secured from the load circuit of vacuum tube 31, more particularly, it is the potential difference across impedance 36. This controlling current in being applied to control device 16, effects a change in gain in said control device 16 through a change in bias of input control element of the vacuum tube 37. The delay device hereinbefore referred to consists of the various resistance and reactive impedance elements in the output circuit of vacuum tube 31 and the other associated resistance and reactive impedance elements in the grid bias or other control circuit of the control device 16. In the case of the reception of a modulated or other complex signal, it is obvious that through the choice of the proper time constant or constants for the delay device circuit, the amplification of the control device may be varied by the carrier, by the modulation, or by any one or a combination of any grouping of the various components of a signal of interest. The desired operation of the vacuum tube here selected for vacuum tube 37 is obtained by the adjustment of the indicated local batteries and their controls, the resistance of the bias resistance 38, the capacitance 40 and the related characteristics of the energy delivered by the controlling amplifier to the control device at point Z. The output of vacuum tube 37, is connected to the primary of coupling transformer 39. The secondary of said transformer 39, tuned by condenser 41 applies a voltage to the input circuit of detector 42. Condensers 32 and 41 of Figure 5 may be connected for simultaneous control, to condensers 13 and 14 of Figures 1, 2 or 3 or condensers 21 and 21' of Figure 4. The desired operation of the vacuum tube here selected is obtained by the adjustment of the indicated local batteries, the resistance of bias resistor 43 and the capacitance 44. There may also be introduced into the bias circuit of detector tube 42, the controlling current from the control amplifier 15. One such use of the controlling current is as follows: when said controlling current is supplied by the modulation of a signal, the aforementioned controlling current may be used to affect vacuum tube 42 to correct in a measure for changes in percentage modulation of the transmitted signal, thereby maintaining between the point of modulation at the transmitter and the point or points of demodulation in the receiver any desired constant overall modulation percentage (for example 80 percent) and thereby achieving certain desirable characteristics in radio receiver operation. More particularly, in a present day 100% modulated constant current transmitter of the usual Heising type, in which the instantaneous percentage of modulation may vary from zero to 100 percent (with its usual deleterious effect upon quality of the modulated signal) the bias on detector tube 42 and also the bias on control tube 37 can be so changed by the modulation actuated controlling current as to minimize the distortion usually produced when the said instantaneous percentage modulation so changes. Likewise, if there is a definite relationship between modulation and carrier in the transmitted wave, it is possible by the application of the modulation actuated controlling current into the bias circuit of tube 42 and into the bias circuit of tube 37 to secure any desired overall relationship between modulation and carrier. More particularly, further, the system can be so arranged that a reduction in modulation percentage at the transmitter can be offset by an increase in modulation percentage of the receiver to maintain any desired modulation percentage, say 100 percent, or any desired modulation relationship, say, an increase in receiver percentage modulation with an increase in transmitter percentage modulation, even from point of original modulation to point or points of final demodulation within the system.

Referring again to Figure 5, the output circuit of tube 42 is loaded by resistor 45 in series with meter 47, which meter 47 is used to indicate the plate current of tube 42. Capacitance 46 is an appropriate bypass condenser shunted across the output circuit of tube 42. Condenser 48 couples the output of tube 42 to the input of tube 49 which may, in all respects, be conventionally connected. The output of tube 49 is connected to meter 50 which measures the output of the system. When collector 11 of Figures 1, 2 and 3 is parallel with the field, or when the parallel loops 20 and 20' are in the positions shown, no voltage appears at point A in Figure 5; the output voltage of the control amplifier is zero, the bias on the control device is therefore most positive, and the amplification of the control device a maximum. When collector 11 is moved slightly, a perceptible voltage appears at point A; this is amplified by tube 27, detected by tube 31, and applied to the control tube 37 at point Z. This voltage is a maximum; the bias on the control device is therefore most negative and the control tube 37 is thereby blocked. When a signal appears at the input of transformer 39, meters 47 and 50 are actuated, their respective readings being, of course, dependent upon the amplitude and character of the so applied signal. It is to be noted that all or any controls used may be mechanically or electrically interlocked where such procedure is desirable. For example, all tuning controls could be operated by a single knob, and the gain control of the control amplifier (resistor 28 in Figure 5) could be interlocked so as to operate synchronously with the loop pickup and so forth. The various elements of the system may be used to control a motor or other device to move the loop collector or collectors in such a manner as to produce no voltage at the output of the control amplifier. More particularly the output of the signal amplifier 17 and the output of the control amplifier 15 might be used thus differentially or otherwise to control a motor or other device which motor might be used to automatically direct a moving object in a particular desired direction with respect to the radiation source location or locations.

I claim:

1. In a directional receiving system, a pair of coaxial loop pickups mounted to rotate about their common axis, a coupling tube connected to the output of each of said pickups, the output circuit of said tubes including a common portion and also including a separate portion, an indicating device included in said common portion for giving a positive direction indication, a pushpull output transformer having a double primary, one of said primaries being included in the separate portion of each of said tubes and an indicating device included in the output of the transformer for giving a null direction indication.

2. A directional receiving system comprising a pair of substantially perpendicular coaxial loops mounted for simultaneous rotation of their common axis, a balancing network including impedance means across which are developed voltages representative of the difference of the current in each of said loops, an indicator actuated thereby whereby a null indication of direction is obtained and a second impedance means across which are developed voltages representative of the sum of the current in each of said loops, an indicator actuated thereby whereby a positive indication of direction is obtained.

3. A directional receiving system in accordance with claim 2 in which said balancing network includes push-pull connected tubes, each of which has its grid circuit connected to one of said loops and its output connected to a push-pull output transformer.

WILLIAM H. OFFENHAUSER, Jr.